Sept. 3, 1946.  J. I. HAASE  2,407,152
METHOD FOR BUILDING PNEUMATIC TIRES
Filed Jan. 30, 1943  2 Sheets-Sheet 2

Inventor
Jorgen I. Haase

By
Attorney

Patented Sept. 3, 1946

2,407,152

UNITED STATES PATENT OFFICE 2,407,152

METHOD FOR BUILDING PNEUMATIC TIRES

Jorgen I. Haase, Akron, Ohio, assignor to Wingfoot Corporation, Akron, Ohio, a corporation of Delaware Application January 30, 1943, Serial No. 474,128

12 Claims. (Cl. 154—14)

This invention relates to methods for building pneumatic tires, and, more particularly, is concerned with improved methods for facilitating the construction of pneumatic automobile and like tires.

It is the general object of the invention to provide methods for building pneumatic tires with a minimum of stock handling, lost time and motion, and a maximum of operator efficiency.

Another object of the invention is the provision of improved methods for facilitating the construction of pneumatic tires and wherein and whereby all of the components of the tire are passed substantially directly and without handling to the tire building drums and with each operator being required to perform only certain standardized parts of the entire building operation, whereby the total operator time required to build a tire is reduced to a minimum.

Figure 1:
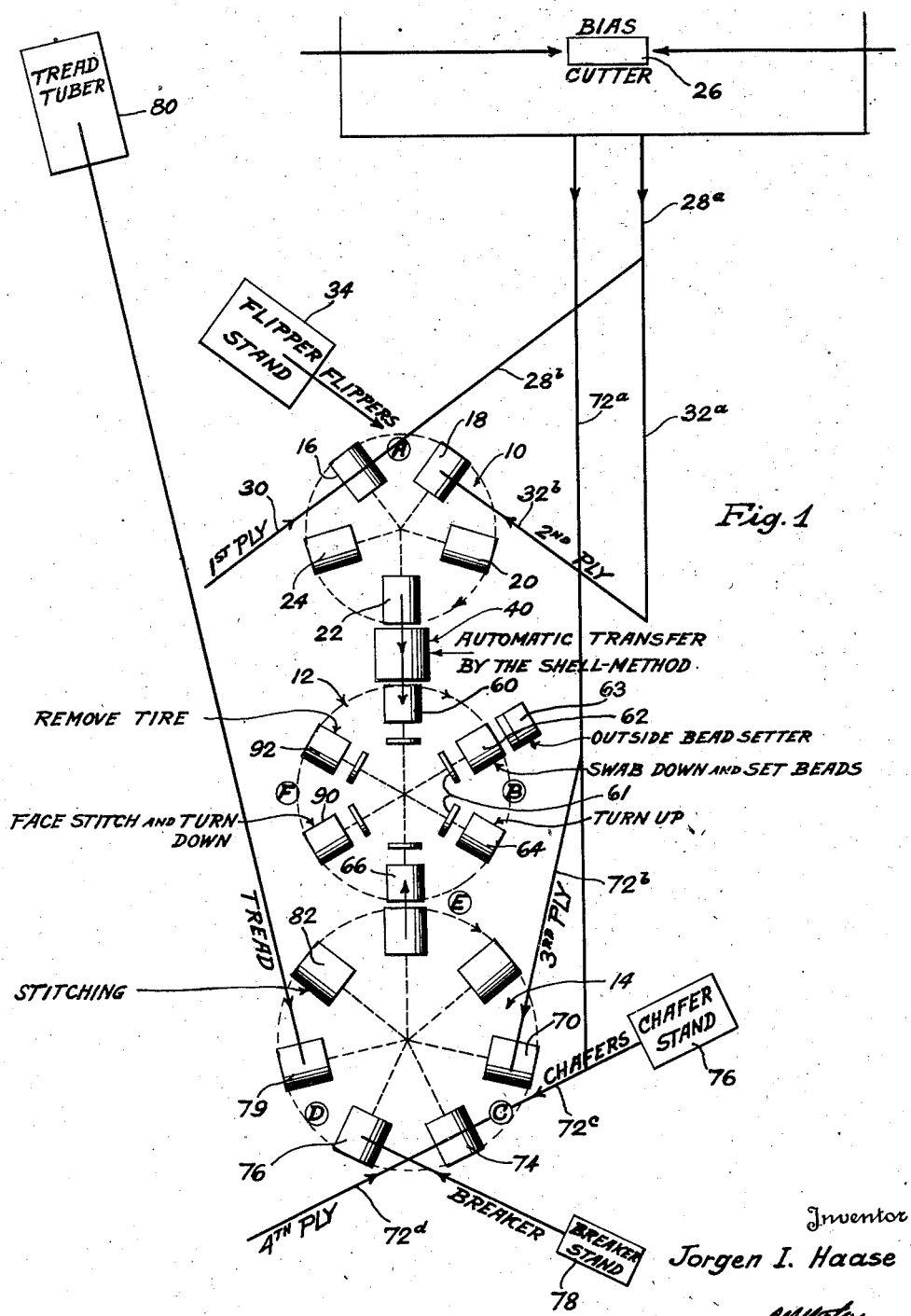
Figure 2:
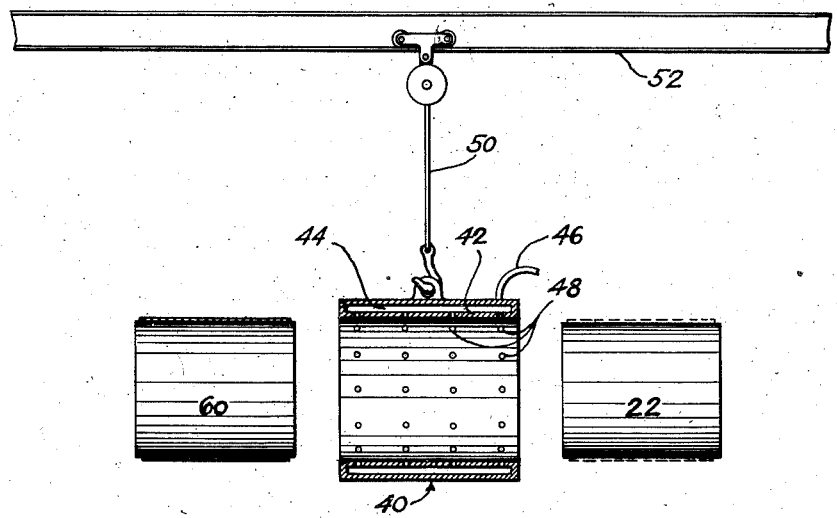
Figure 3:
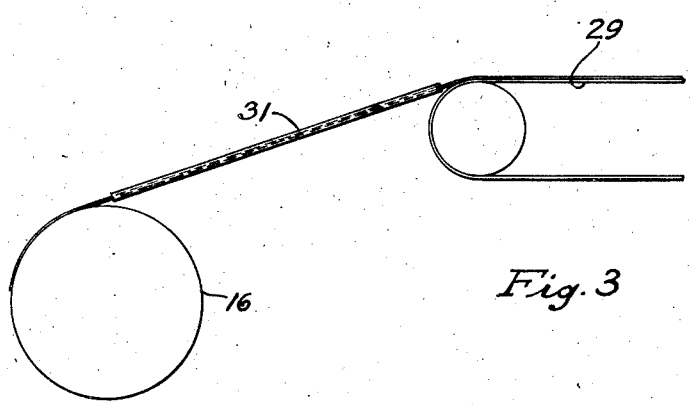

The foregoing objects of the invention, and other objects which will become apparent as the description proceeds, are achieved by the provision of improved methods, one embodiment of which is diagrammatically illustrated in plan view in Fig. 1 of the drawings. Fig. 2 of the drawings is a vertical sectional view on an enlarged scale of the band transfer mechanism included in the apparatus of Fig. 1. Fig. 3 of the drawings is a side elevation of permanently located and loaded conveyor and guide means associated with a building station of the apparatus.

For a better understanding of the invention, reference should be had to the accompanying drawings, in which the numerals 10, 12 and 14 indicate rotatable turrets, each one of which includes a plurality of tire building drums, and with the several turrets being associated with each other so that bands constructed on the drums of turrets 10 and 14 can be transferred to the drums of turret 12 and assembled thereon as hereinafter described.

More specifically, and having reference to turret 10, a plurality of tire building drums having drum stations 16, 18, 20, 22 and 24 are provided along with an operator station identified by the letter A. An operator positioned at the station A first builds a ply of bias-cut tire building fabric onto the drum at position 16. The ply of fabric is taken from a long length of longitudinally aligned bias-cut fabric portions cut by bias-cutter 26 and secured end to end and passed by suitable permanently loaded and located conveyor means 29 along a path 28a and 28b, with the length of bias-cut fabric being conveniently turned back upon itself, as evidenced by the arrow 30, so as to pass directly to the drum station 16. The conveyor means for handling the fabric terminate in permanently loaded and located guide means 31 adjacent the drum at station 16 which will facilitate the direct application of the fabric to the drum and without interfering with the indexing of the drums.

After the first ply of fabric is applied to the drum at station 16, the turret 10 is indexed to advance the drum to the drum station 18. Now a second ply of bias-cut rubberized tire fabric is applied over the first ply and, as before, the aligned lengths of bias-cut rubber portions produced by the bias-cutter 26 are moved by suitable permanently loaded and located conveyor means along the path 32a, back on the path 32b and into a permanently loaded and located guide means positioned above the drum station 18 so that the second ply can be readily built into the band by the operator at station A. The operator at station A also builds into the band suitable flipper strips passed on permanently loaded and located guide means from a flipper stand 34 directly onto the building drum positioned as the drum station 18.

It will be understood that the operator at station A, after completing the building of the multiply band of alternately-laid bias-cut tire fabric, as described just above, will build on the drum then occupying the drum station 16 a one-ply band of fabric, as before. Thus, a single operator at the station A will build a one-ply band on a bare drum at station 16 and then turn and build the second ply and flipper strips onto the band occupying station 18. Accordingly, by moving each building drum from position to position, due to the indexing of the turret 10, a series of multiply bands will be built progressively and passed around to the drum station 22. At this point each multi-ply band is in alignment with the automatic transferring means indicated as a whole by the numeral 40, and shown more in detail in Fig. 2 of the drawings. Fig. 2 illustrates that the automatic transfer means include a cylindrical shell 42 of double-walled construction whereby a chamber 44 is provided which is connected to a source of subatmospheric pressure by a flexible conduit 46. A plurality of radially directed openings 48 in the inner face of the cylinder 42 are connected to the chamber 44. The entire cylinder is adapted to be supported on suitable hanger and roller means 50 by an overhead beam 52 whereby the cylinder can move from a position surrounding the drum at station 22 to a position surrounding a drum at station 60 on turret 12.

With the automatic transfer means just described, a multi-ply band carried at drum station 22 in alignment with the automatic transfer means can be picked up by the transfer means due to the suction of the shell or cylinder and can then be moved over and deposited on the building drum at station 60. Sometimes it is advisable to facilitate the transfer operation by collapsing the drum at station 22 after the transfer means has gripped the band. Also, movement onto the drum at station 60 is facilitated by partially collapsing this drum during the transfer operation and thereafter expanding the drum.

After the multi-part band has been transferred from a drum at station 22 on the turret 10 to a drum at station 60 on the turret 12, the drum with the band thereon is indexed by the movement of the turret 12 to drum station 62, and at this station the band edges are swabbed down over the edges of the drum, and the inner and outer beads moved into engagement with the swabbed-down band edges all by automatic means generally similar to those used in standard tire building operations, and which will not be described in detail. Each drum in turret 12 is provided with its own individual inside bead setting rings and means 61, but a common outside bead setting ring and means 63 is provided at the drum station 62. An operator at operator station B will perform the operation of placing the outside bead on the outside bead ring and means 63. Thereafter, the turret 12 is indexed to advance the band to the drum station 64 and the edges of the band are turned up over the beads by automatic means, known in standard tire building operations. The indexing of the turret 12 then advances the band to the drum station 66.

Turning now to the operation of the turret 14, an operator positioned at operator station C first applies a ply of bias-cut rubberized fabric onto a building drum positioned at the drum station 70. The ply of bias-cut fabric is supplied from a length of aligned and connected bias-cut portions of rubberized fabric fed directly from the bias-cutter 26 on the path 72a and 72b and by way of permanent conveyor and guide means as before described. The same operator builds another ply of bias-cut rubberized fabric onto a drum positioned at the drum station 74, and it will be understood that the building drum positioned at this point will have previously had a ply of fabric built thereon at the previous station. The ply of fabric built onto the drum at the station 74 is made from a length of bias-cut rubberized fabric formed adjacent bias-cutter 26 and passed by permanently located conveyor and guide means, as before described, along the path 72a, 72c, and then back on itself as indicated by the arrow 72d so as to be positioned adjacent the drum station 74. The operator at station C will also build suitable chafer strips passed from a chafer stand 76 by permanently located conveyor and guide means directly to the drum occupying the drum station 74.

The turret 14 is then indexed so that the drum will be advanced to the drum station 78, and at this point an operator positioned at station D will build onto the drum a suitable breaker strip assembly passed directly on fixed guide means from the breaker stand 78. Before the next indexing operation the operator at station D will also build onto the building drum occupying the drum station 79 a tread and sidewall assembly passed to the building drum on permanently located and loaded conveyor and guide means from a tread and sidewall tubing apparatus 80.

The indexing of the turret 14 then advances the drums, and the drum occupying the drum station 82 may have the various parts of the band built thereon stitched together by suitable automatic stitching mechanism.

The further indexing of the turret 14 advances the building drum to a point in alignment with the drum station 66 which carries the multi-ply band built up on the turret 10 and transferred, as previously described, to the turret 12. An operator positioned at station E will then effect the transfer of the band from the building drum of turret 14 to the band carried by the drum at station 66 of turret 12, and although suitable mechanical means for achieving the transfer can be provided, it is quite convenient to have the operator at station E effect the transfer by manual means, for example by sliding the band from the drum of the turret 14 over the band carried by the drum at station 66. This is accomplished by simultaneously rotating the adjacent and aligned drums and having the operator effect the transfer with the use of a pole or bar.

It will be recognized that the multi-ply bands built progressively and in turn on the drums of the turret 14 are passed one by one to the drums of the turret 12, each one of which carries a multi-ply band. Each assembly of multi-ply bands, resulting from the transfer operation last described, is then by indexing of turret 12 carried to drum station 90, where, by automatic means, well known in standard tire building operation, the assembly is stitched into a multi-ply tire carcass structure. Also, the edges of the second band are turned down around and under the beads of the first band. Thereafter, the indexing of the turret 12 brings the completely constructed tire carcass to the drum station 92 where by automatic means, also well known in standard tire building operations, the drum may be collapsed so the completed tire carcass can be removed. At drum station 92 the operator F removes the carcass, places a bead on the inner bead-setting means, expands the drum and cements the drum edges. The drum is then ready, when it arrives at station 60 of turret 12 to receive the first band built on the drums of turret 10.

It is believed that the improved method of the invention will be understood from the foregoing description. Suffice it to say that all of the relatively light operations can be performed by female labor; for example, the operations performed at stations A, B, C, and possibly D. The transfer operation at station E and the tire removing operation at station F ordinarily employ male labor. Also, it will be recognized that the exact sequence of operations as particularly described and illustrated herein can be varied to adapt the invention to perform building operations on particular tire sizes or types. Further, it will be recognized that the invention provides a smooth flow of materials without handling and directly from the source which creates the finished materials to the station in which they are built into the tire. It furthermore permits use of permanently located and loaded conveyor and guiding means, as generally described, for each variety of building material used. This is a very important advantage of the invention. At each building station or building position, only a single building material or a pair of materials are handled and each operator performs only a part of a progressive tire building operation whereby the utmost in speed and efficiency are readily obtained. The various parts of the tire building operation are broken down into certain basic operations at each building station or position and these various parts can be so correlated one with another that each operator producing part of the completed tire will require substantially the same amount of time as every other operator performing other parts of the building operation. This results in a coordinated teamwork type of building operation, and with the indexing of the turrets being automatic or under the control of the building group foreman.

While, in accordance with the patent statutes, the invention has been specifically illustrated and described, it should be clearly understood that the invention is not limited thereto or thereby, but that the scope of the invention is defined in the appended claims.

What I claim is:

1. That method of building pneumatic tires which includes the steps of passing aligned lengths of bias-cut fabric to an operator station, building a one-ply band therefrom, moving the band to another position of the operator station, building a second ply and flipper strips onto the band, moving the band to a second operator station, swabbing down the edges of the band, setting tire beads on the edges of the band and turning up the edges of the band around the beads, passing aligned lengths of bias-cut fabric to a third operator station, building a second one-ply band therefrom, moving the second band to another position of the third operator station and applying a second ply and chafer strips thereto, moving the second band to a fourth operator station and applying a breaker thereto, moving the second band to another position of the fourth operator station and applying a tread and sidewall thereto, moving the second band over the first-named band, moving the bands to a fifth operator station and face stitching the bands together and turning the edges of the second band under the beads of the first-named band, said operations being performed repeatedly at the several operator stations so that a plurality of tires are being constructed simultaneously.

2. That method of building pneumatic tires which includes the steps of passing aligned lengths of bias-cut fabric to an operator station, building a one-ply band therefrom, building a second ply and flipper strips onto the band, moving the band to a second operator station, setting tire beads on the edges of the band and turning up the edges of the band around the beads, passing aligned lengths of bias-cut fabric to a third operator station, building a second one-ply band therefrom, moving the second band to another position of the third operator station and applying a second ply and chafer strips thereto, moving the second band to a fourth operator station and applying a breaker thereto, moving the second band to another position of the fourth operator station and applying a tread and sidewall thereto, moving the second band over the first-named band, moving the bands to a fifth operator station and face stitching the bands together and turning the edges of the second band under the beads of the first-named band.

3. That method of building pneumatic tires which includes the steps of passing aligned lengths of bias-cut fabric to an operator station, building a one-ply band therefrom, building a second ply and flipper strips onto the band, moving the band to a second operator station, setting tire beads on the edges of the band and turning up the edges of the band around the beads, passing aligned lengths of bias-cut fabric to a third operator station, building a second one-ply band therefrom, applying a second ply and chafer strips thereto, moving the second band to a fourth operator station and applying a breaker thereto, moving the second band to another position of the fourth operator station and applying a tread and sidewall thereto, moving the second band over the first-named band, moving the bands to a fifth operator station and face stitching the bands together and turning the edges of the second band under the beads of the first-named band.

4. That method of building pneumatic tires which includes the steps of passing aligned lengths of bias-cut fabric to an operator station, building a one-ply band therefrom, building a second ply and flipper strips onto the band, moving the band to a second operator station, setting tire beads on the edges of the band and turning up the edges of the band around the beads, passing aligned lengths of bias-cut fabric to a third operator station, building a second one-ply band therefrom, applying a second ply and chafer strips thereto, moving the second band to a fourth operator station and applying a breaker, tread and sidewall thereto, moving the second band over the first-named band, moving the bands to a fifth operator station and face stitching the bands together and turning the edges of the second band under the beads of the first-named band.

5. That method of building pneumatic tires which includes the steps of passing aligned lengths of bias-cut fabric to an operator station, building a one-ply band therefrom, building a second ply and flipper strips onto the band, moving the band to a second operator station, setting tire beads on the edges of the band and turning up the edges of the band around the beads, passing aligned lengths of bias-cut fabric to a third operator station, building a second one-ply band therefrom, applying a second ply and chafer strips thereto, moving the second band to a fourth operator station and applying a breaker, tread and sidewall thereto, moving the second band over the first-named band, moving the bands to a fifth operator station and face stitching the bands together, said operations being performed repeatedly at the several operator stations so that a plurality of tires are being constructed simultaneously.

6. That method of building a pneumatic tire which includes the steps of building a two-ply band at a first operator station, setting beads adjacent the edges of the band, turning the edges of the band over the beads, separately building a second two-ply band including chafers, breaker, tread and sidewalls at a second operator station, moving the second band over the first-named band at a third operator station, turning the edges of the second band under the beads of the first-named band, and face stitching the bands together.

7. That method of building a pneumatic tire which includes the steps of building a multiple-ply band, setting beads adjacent the edges of the band, turning the edges of the band over the beads, separately building a second multiple-ply band including chafers, breaker, tread and sidewalls, moving the second band over the first-named band, turning the edges of the second band under the beads of the first-named band, and face stitching the bands together.

8. That method of building a pneumatic tire which includes the steps of building a multiple-ply band, setting beads adjacent the edges of the band, separately building a second multiple-ply band including chafers, breaker, tread and sidewalls, moving the second band over the first-named band, and face stitching the bands together.

9. A method of producing pneumatic tires which consists in forming a succession of multi-ply bands at one station, simultaneously forming an equally timed succession of other multi-ply bands including tire treads at another station, and transferring said bands successively from their forming stations directly to tire-assembly stations in timed relation, and joining the multi-ply bands at the tire assembly stations.

10. That method of building a pneumatic tire, which includes the steps of building a multi-ply band at one station, building another multi-ply band at a second station, passing both bands to a third station, and joining the bands at the third station to form a tire carcass.

11. That method of building pneumatic tires which includes the steps of building a one ply band of a tire carcass and building a second ply on a one ply band of a second tire carcass at a single operator station, building a one ply band for the first tire carcass and building a second ply on a one ply band for the second tire carcass at a second operator station, moving the constructed two ply bands of the second tire carcass from the first and second operator stations to a third operator station, joining the two ply bands of the second tire carcass together at the third operator station to form a four ply tire carcass, and concurrently with said last named movement, moving the one ply bands of the first tire carcass into position at their respective operator stations to receive the second plies.

12. That method of building pneumatic tires which includes the steps of building a one ply band tire carcass and building a second ply on a one ply band of a second tire carcass at a single operator station, building a one ply band for the first tire carcass and building a second ply on a one ply band for the second tire carcass at a second operator station, moving the constructed two ply bands of the second tire carcass from the first and second operator stations to a third operator station, and joining the two ply bands of the second tire carcass together at the third operator station to form a four ply tire carcass.

JORGEN I. HAASE.